(12) United States Patent
Ogawa et al.

(10) Patent No.: US 10,775,961 B2
(45) Date of Patent: Sep. 15, 2020

(54) INSTALLMENT LOCATION PLANNING ASSISTANCE METHOD, TERMINAL DEVICE, INSTALLMENT LOCATION PLANNING ASSISTANCE SYSTEM, AND PROGRAM

(71) Applicant: Mitsubishi Electric Corporation, Tokyo (JP)

(72) Inventors: Yuki Ogawa, Tokyo (JP); Hirotoshi Yano, Tokyo (JP); Masaaki Yabe, Tokyo (JP); Satoshi Minezawa, Tokyo (JP); Ichiro Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 591 days.

(21) Appl. No.: 14/907,850

(22) PCT Filed: Aug. 7, 2014

(86) PCT No.: PCT/JP2014/070945
§ 371 (c)(1),
(2) Date: Jan. 27, 2016

(87) PCT Pub. No.: WO2015/020174
PCT Pub. Date: Feb. 12, 2015

(65) Prior Publication Data
US 2016/0179340 A1    Jun. 23, 2016

(30) Foreign Application Priority Data
Aug. 7, 2013   (JP) ................................. 2013-164385

(51) Int. Cl.
*G06F 3/0481* (2013.01)
*H04B 17/309* (2015.01)
(Continued)

(52) U.S. Cl.
CPC ......... *G06F 3/04817* (2013.01); *G08C 17/02* (2013.01); *H04B 17/309* (2015.01); *H04L 12/2803* (2013.01)

(58) Field of Classification Search
CPC .......................... G06F 3/04817; H04B 17/309
See application file for complete search history.

(56) References Cited

U.S. PATENT DOCUMENTS 6,972,682 B2 * 12/2005 Lareau .................. G06Q 10/08
                                                340/5.92
9,307,368 B1 *  4/2016 Bartlett ................... H04W 4/04
(Continued)

FOREIGN PATENT DOCUMENTS

CN       102185746 A     9/2011
JP       2003-284161 A   10/2003
(Continued)

OTHER PUBLICATIONS

K Subaashini, "ZigBee RF Signal Strength for Indoor Location Sensing—Experiments and Results", published by ICACT Transactions on Advanced Communications Technology (TACT) vol. 1, Issue 2, Sep. 2012 (Year: 2012).*

(Continued)

*Primary Examiner* — Ryan Barrett
(74) *Attorney, Agent, or Firm* — Posz Law Group, PLC (57) ABSTRACT

An appliance information acquirer (240) acquires appliance information including identification information for an appliance from a home controller. A location setter (241) displays on a display a floor plane that shows an inside of a home and an icon that is associated with the appliance based on the acquired appliance information, and positions the icon on the floor plane in accordance with a user operation. A measurement requestor (242) acquires a radio quality index for the appliance corresponding to the icon positioned on the floor plan from the home controller. A measurement (Continued)

result display (243) changes a display mode of the icon positioned on the floor plan, in accordance with the radio quality index acquired for the appliance.

13 Claims, 9 Drawing Sheets (51) Int. Cl.
*G08C 17/02* (2006.01)
*H04L 12/28* (2006.01)

(56) References Cited

U.S. PATENT DOCUMENTS

| | | | |
|---|---|---|---|
| 2003/0130039 A1* | 7/2003 | Nelson | G01S 5/02 463/42 |
| 2004/0143428 A1 | 7/2004 | Rappaport et al. | |
| 2004/0203870 A1* | 10/2004 | Aljadeff | G01S 5/06 455/456.1 |
| 2004/0258012 A1* | 12/2004 | Ishii | H04L 47/10 370/328 |
| 2005/0094610 A1* | 5/2005 | de Clerq | G05B 15/02 370/338 |
| 2005/0131931 A1 | 6/2005 | Kawajiri | |
| 2005/0131991 A1 | 6/2005 | Ogawa et al. | |
| 2006/0019679 A1* | 1/2006 | Rappaport | G01S 5/0252 455/456.5 |
| 2006/0092037 A1 | 5/2006 | Neogi et al. | |
| 2006/0179355 A1* | 8/2006 | Bouchard | H04L 41/024 714/42 |
| 2006/0247847 A1* | 11/2006 | Carter | A47F 10/04 701/498 |
| 2007/0232319 A1* | 10/2007 | Bells | H04W 64/00 455/456.1 |
| 2009/0066473 A1* | 3/2009 | Simons | G01S 5/0027 340/3.1 |
| 2009/0082034 A1* | 3/2009 | Gray | H04W 64/00 455/456.1 |
| 2009/0111485 A1* | 4/2009 | Kitani | H04W 48/18 455/456.1 |
| 2009/0131082 A1* | 5/2009 | Gast | G01S 5/0205 455/457 |
| 2010/0099410 A1* | 4/2010 | Sweeney | H04W 4/02 455/435.1 |
| 2010/0109842 A1* | 5/2010 | Patel | G01C 21/206 340/10.1 |
| 2010/0114340 A1* | 5/2010 | Huizenga | H05B 37/0272 700/90 |
| 2011/0183685 A1* | 7/2011 | Burton | G06F 21/316 455/456.1 |
| 2011/0254683 A1* | 10/2011 | Soldan | G01S 19/49 340/539.13 |
| 2011/0260922 A1* | 10/2011 | Zhang | G01S 5/0252 342/451 |
| 2011/0268060 A1* | 11/2011 | Heidari | H04B 7/2606 370/329 |
| 2011/0280138 A1* | 11/2011 | Terry | H04B 7/15535 370/252 |
| 2012/0021762 A1* | 1/2012 | Garin | G01C 21/206 455/456.1 |
| 2012/0087212 A1* | 4/2012 | Vartanian | G01S 15/08 367/118 |
| 2013/0109413 A1* | 5/2013 | Das | H04W 4/04 455/456.6 |
| 2013/0122935 A1* | 5/2013 | Das | G01S 5/0252 455/456.3 |
| 2013/0157683 A1* | 6/2013 | Lymberopoulos | H04W 4/04 455/456.1 |
| 2013/0196684 A1* | 8/2013 | Dong | H04W 4/04 455/456.1 |
| 2013/0231062 A1 | 9/2013 | Yahagi et al. | |
| 2013/0252587 A1* | 9/2013 | Ko | H04W 12/06 455/411 |
| 2013/0267251 A1* | 10/2013 | Khorashadi | H04W 4/023 455/456.3 |
| 2013/0290338 A1* | 10/2013 | Lee | G06F 17/30731 707/739 |
| 2013/0324165 A1* | 12/2013 | Fujiwara | H04W 12/06 455/457 |
| 2014/0021942 A1* | 1/2014 | Kim | G01R 33/10 324/207.11 |
| 2014/0045515 A1* | 2/2014 | Austin | H04W 4/04 455/456.1 |
| 2014/0148196 A1* | 5/2014 | Bassan-Eskenazi | G01S 11/02 455/456.1 |
| 2014/0171118 A1* | 6/2014 | Marti | G01S 5/0252 455/456.3 |
| 2014/0237064 A1* | 8/2014 | Lin | H04L 41/046 709/208 |
| 2014/0274115 A1* | 9/2014 | Michelson | H04W 4/028 455/456.1 |
| 2014/0274357 A1* | 9/2014 | Nguyen | G07F 17/326 463/29 |
| 2014/0295878 A1* | 10/2014 | Yang | G01S 5/0252 455/456.1 |
| 2014/0315571 A1* | 10/2014 | Saari | H04W 64/00 455/456.1 |
| 2014/0323148 A1* | 10/2014 | Schmalstieg | G01C 21/005 455/456.1 |
| 2014/0329537 A1* | 11/2014 | Huang | H04W 64/003 455/456.1 |
| 2014/0329543 A1* | 11/2014 | Hayashi | H04M 1/7253 455/456.1 |
| 2014/0355499 A1* | 12/2014 | Akhlaq | H04W 52/0203 370/311 |
| 2018/0069745 A1* | 3/2018 | Wang | H04W 24/04 |

FOREIGN PATENT DOCUMENTS

| | | |
|---|---|---|
| JP | 2004-320209 A | 11/2004 |
| JP | 2005-198252 A | 7/2005 |
| JP | 2006-100884 A | 4/2006 |
| JP | 2007-525040 A | 8/2007 |
| JP | 2012-103045 A | 5/2012 |
| JP | 2012-182520 A | 9/2012 |
| JP | 2013-134603 A | 7/2013 |
| WO | 2004/066077 A2 | 8/2004 |

OTHER PUBLICATIONS

Wikipedia, "Received Signal Strength Indication", published on Feb. 6, 2009, [online] https://web.archive.org/web/20090206014553/ http://en.wikipedia.org:80/wiki/Received_Signal_Strength_ Indication (Year: 2009).*

Wikipedia, "Heat map", published on Sep. 2, 2008, [online] https:// web.archive.org/web/20080902011408/https://en.wikipedia.org/wiki/ Heat_mapt (Year: 2008).*

Merriam-Webster, "Definition of icon", [Retrieve online] https:// www.merriam-webster.com/dictionary/icon (Year: 2019).*

Office Action dated May 4, 2017 issued in corresponding CN patent application No. 201480044485.2 (and English translation).

International Search Report of the International Searching Authority dated Oct. 7, 2014 for the corresponding International application No. PCT/JP2014/070945 (and English translation).

Extended European Search Report dated Feb. 2, 2017 issued in corresponding EP patent application No. 14834707.3.

Office Action dated Dec. 23, 2019 issued in corresponding IN patent application No. 201647006231.

Office Action dated Jun. 23, 2020 issued in corresponding Brazilian patent application No. 1120160023331 (and partial English translation).

* cited by examiner

INSTALLMENT LOCATION PLANNING ASSISTANCE METHOD, TERMINAL DEVICE, INSTALLMENT LOCATION PLANNING ASSISTANCE SYSTEM, AND PROGRAM

CROSS REFERENCE TO RELATED APPLICATION

This application is a U.S. national stage application of International Application No. PCT/JP2014/070945 filed on Aug. 7, 2014, which claims priority to Japanese Patent Application No. 2013-164385 filed on Aug. 7, 2013, the contents of which are incorporated herein by reference.

TECHNICAL FIELD

The present disclosure relates to a technique of assisting in planning a location where a home controller is installed.

BACKGROUND ART

A system for managing an operation or the like of each household electrical appliance by a home controller is known, in which the home controller is connected via a communication network to the household electrical appliances provided in a home (see Patent Literature 1).

CITATION LIST

Patent Literature

Patent Literature 1: Unexamined Japanese Patent Application Kokai Publication No. 2013-134603

SUMMARY OF INVENTION

Technical Problem

The communication network between the home controller and each household electrical appliance in such a system is desirably implemented using a wireless network to facilitate introduction of the system.

When the wireless network is employed as described above, the home controller is required to be installed at an appropriate location within the home to ensure the communication between the home controller and all the household electrical appliances to be managed which are installed in various locations within the home.

A typical approach that has been taken in a construction process of installing the home controller is that an electric field strength of the wireless communication between the home controller and each of the household electrical appliances is measured and a person in charge of the installation plans the installation location of the home controller with consideration of each measured electric field strength.

This approach thus requires such a person to have a good knowledge about wireless technologies, which poses extreme difficulties in planning the installation location of the home controller for a person with a poor knowledge about the technologies.

The present disclosure has been made to solve the above-described conventional problems, and an objective of the present disclosure is to provide an installation location planning assistance method and the like for assisting a user to install a home controller at an appropriate location.

Solution to Problem

To achieve the foregoing objective, a method for assisting in planning an installation location according to the present disclosure includes:

acquiring, by an appliance information acquirer, appliance information including identification information for an appliance from a home controller;

displaying, by a location setter, on a display a floor plan that shows an inside of a home and an icon that is associated with the appliance based on the acquired appliance information, and positioning, by the location setter, the icon on the floor plan in accordance with a user operation;

acquiring, by a radio quality acquirer, a radio quality index for the appliance corresponding to the icon positioned on the floor plan from the home controller; and changing, by a radio quality display, a display mode of the icon positioned on the floor plan, in accordance with the radio quality index acquired for the appliance.

Advantageous Effect of Invention

A technique of the present disclosure enables a user to easily plan an appropriate location for installation of the home controller.

DESCRIPTION OF EMBODIMENTS

Embodiments of the present disclosure are hereinafter described in detail with reference to the drawings.

Figure 1:
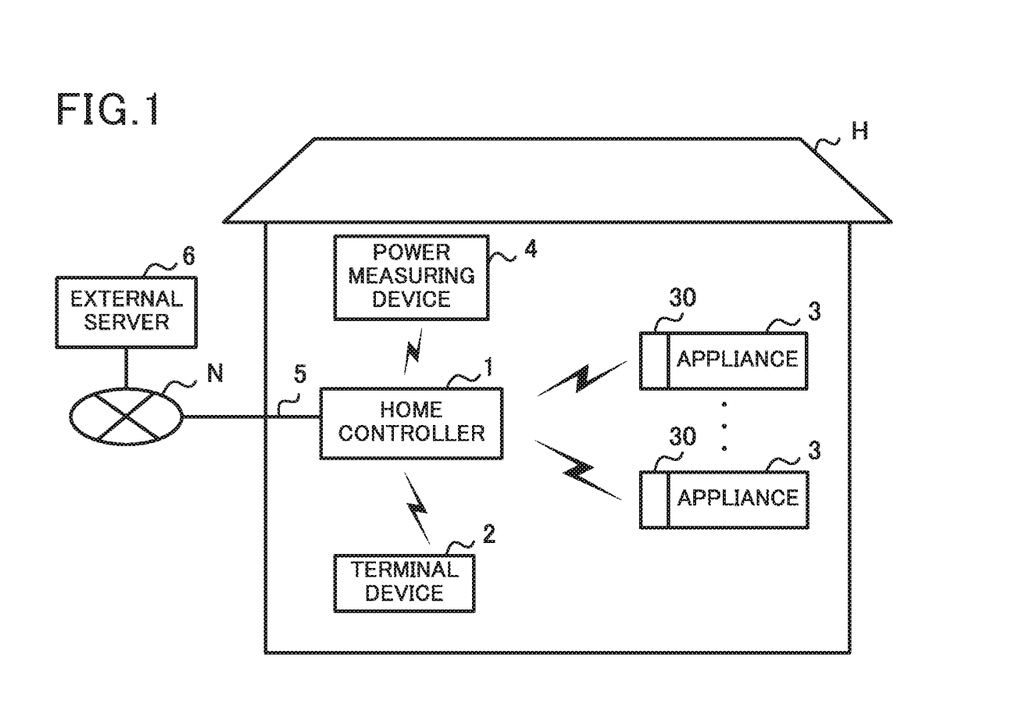
FIG. 1 is a diagram illustrating a configuration of an installation location planning assistance system according to an embodiment of the present disclosure.

FIG. 1 is a diagram illustrating a configuration of an installation location planning assistance system according to an embodiment of the present disclosure. The installation location planning assistance system includes a home controller 1 and a terminal device 2. FIG. 1 illustrates that the home controller 1, the terminal device 2, appliances 3, and a power measuring device 4 constitute an operation management system for the appliances 3, which are used in an ordinary household (home appliance managing system).

The appliances 3 include household electrical appliances including, for example, an air conditioner, a television, a refrigerator, an induction heating (IH) cooker, and the like. Each appliance 3 is connected through its external communication adapter 30 via a wireless network (unillustrated) constructed within a home H to the home controller 1. The wireless network may be, for example, a network compliant with ECHONET Lite. The appliance 3 may include an internal component corresponding to the communication adapter 30 so as to be connected via the wireless network to the home controller 1.

The power measuring device 4 measures power consumption of the home H. The power measuring device 4 is connected via the above-described wireless network to the home controller 1 and wirelessly transmits data indicating the measured power consumption to the home controller 1 at a predetermined timing.

Figure 2:
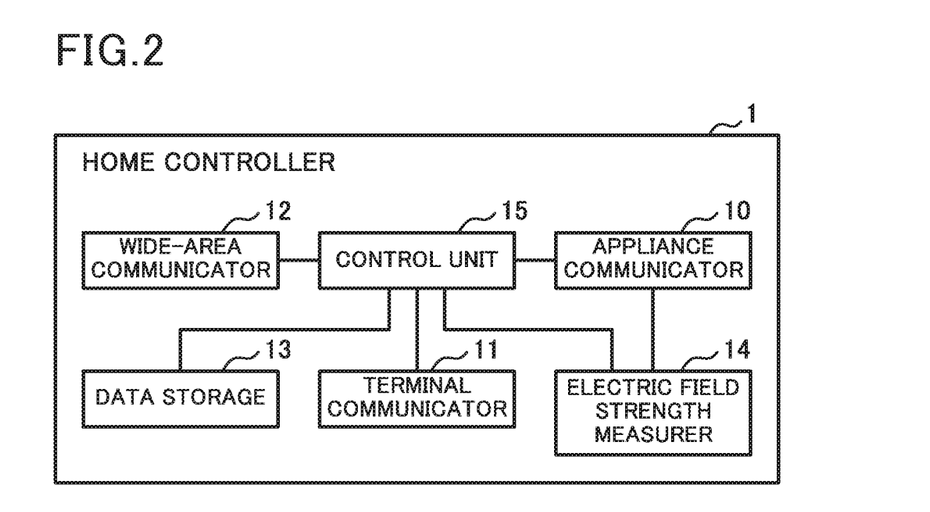
FIG. 2 is a block diagram illustrating a configuration of a home controller of the embodiment.

The home controller 1, which is installed at an appropriate location within the home H, monitors the power consumption of the home, controls an operation of each appliance 3, and monitors operating states of each appliance 3. The home controller 1 includes an appliance communicator 10, a terminal communicator 11, a wide-area communicator 12, a data storage 13, an electric field strength measurer 14, and a control unit 15, as illustrated in FIG. 2.

The appliance communicator 10 includes a communication interface, for example a wireless local area network (LAN) card or the like, connected to the above-described wireless network, and conducts, under the control of the control unit 15, wireless data communication with the communication adapter 30 of each appliance 3 and with the power measuring device 4.

The terminal communicator 11 includes a predetermined short-range wireless communication interface, and conducts data communication with the terminal device 2, under the control of the control unit 15, in compliance with the well-known wireless LAN standard, for example Wi-Fi (registered trademark) or the like.

The wide-area communicator 12 includes a predetermined wide-area communication interface connected via a wired LAN 5 to a wide-area network N such as the Internet or the like, as illustrated in FIG. 1, and conducts data communication with an external server 6 and the like. Here, the external server 6 is a server computer installed by, for example, a manufacturer to sell the home controller 1 or other installer, and serves as a general web server. The external server 6 includes a database for managing various types of information used for providing remote monitoring and remote control services of each appliance 3 to a contractor (that is, a user who purchases the home controller 1).

Returning to FIG. 2, the data storage 13 serves as a so-called secondary storage (auxiliary storage) and is configured by, for example, a readable/writable nonvolatile semiconductor memory, such as a flash memory or the like. The data storage 13 stores, for example, various programs including a program for controlling each appliance 3, a program for monitoring the operating states of each appliance 3, a program for conducting data communication with the terminal device 2 or the external server 6, and/or the like, and also stores various data used for execution of each program, neither of which are illustrated.

The electric field strength measurer 14 measures an electric field (radio wave) strength in wireless communication with each appliance 3. More specifically, the electric field strength measurer 14 measures an electric field (radio wave) strength in wireless communication with the communication adapter 30 connected to each appliance 3. In the embodiment, the electric field strength measurer 14 measures a received signal strength indicator (RSSI) of a radio signal received from the communication adapter 30 of each appliance 3.

The control unit 15 includes a central processing unit (CPU), a read only memory (ROM), a random access memory (RAM), and the like (none of which are illustrated), and provides overall control of the home controller 1. The functional details of the control unit 15 are described below.

Figure 3:
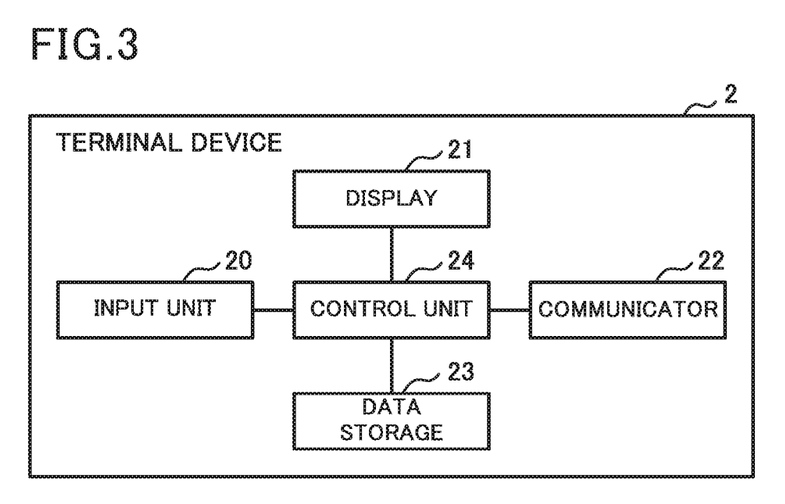
FIG. 3 is a block diagram illustrating a configuration of a terminal device of the embodiment.

Returning to FIG. 1, the terminal device is, for example, a portable communication device with display function, such as a tablet personal computer, a smartphone, and the like. The terminal device 2 includes an input unit 20, a display 21, a communicator 22, a data storage 23, and a control unit 24, as illustrated in FIG. 3.

The input unit 20 is configured by a touch panel, a touch pad, or the like, and conducts processing to receive an operation input from a user. The display 21 is configured by a liquid crystal display or the like, and displays various screens or the like in accordance with the user operation under the control of the control unit 24.

The communicator 22 includes a predetermined wireless communication interface. The communicator 22 conducts, for example, data communication with the home controller 1 in compliance with the well-known wireless LAN standard, such as Wi-Fi (registered trademark) or the like.

Figure 4:
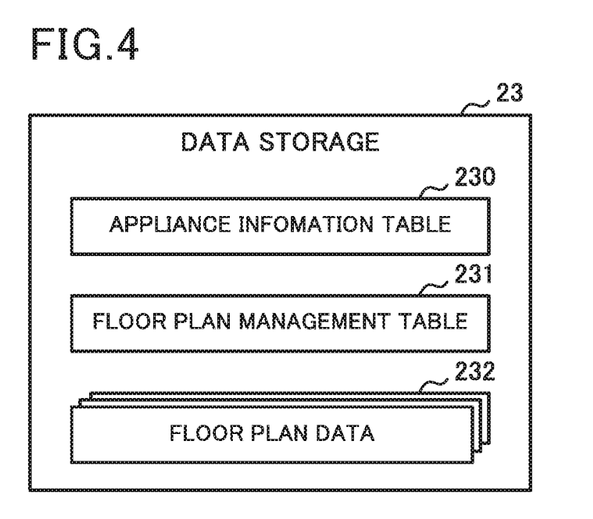
FIG. 4 is a diagram illustrating contents stored in a data storage of the terminal device of the embodiment.

The data storage 23 serves as a so-called secondary storage (auxiliary storage) and is configured by, for example, a readable/writable nonvolatile semiconductor memory, such as a flash memory or the like. The data storage 23 stores a table or the like for an installation location planning assistance process (described in more detail below) to be executed by the control unit 24. Specifically, as illustrated in FIG. 4, the data storage 23 stores an appliance information table 230, a floor plan management table 231, and floor plan data 232. The data storage 23 also stores a program for the unillustrated installation location planning assistance process.

The data storage 23 also stores a program for remotely controlling each appliance 3, a program for monitoring operating states of each appliance 3, various data to be used in execution of these programs, and the like, neither of which are illustrated.

Figure 5:
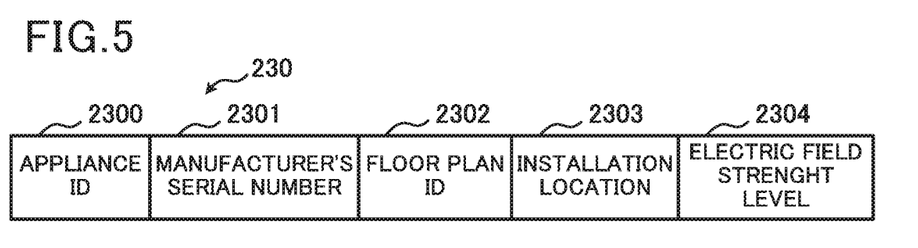
FIG. 5 is a diagram illustrating a configuration of an appliance information table of the embodiment.

The appliance information table 230 is information regarding each appliance 3 installed in the home H. The appliance information table 230 is, as illustrated in FIG. 5, a data table in which multiple records are registered each including items, such as an appliance identification (ID) 2300, a manufacturer's serial number 2301, a floor plan ID 2302, an installation location 2303, an electric field strength level 2304, and the like. In the installation location planning assistance process described below, each record is registered in the appliance information table 230 and setting of each item is conducted.

The appliance ID 2300 includes a preassigned ID (appliance ID) to uniquely identify each appliance 3. The appliance ID is assigned by the home controller 1. The manufacturer's serial number 2301 includes a manufacturer's serial number of the appliance 3. The floor plan ID 2302 includes an ID for identifying the floor plan including the installation location of the appliance 3. For example, a floor plan may be prepared one by one for each floor (first floor, second floor, or the like) of the home H.

The installation location 2303 includes information indicating an installation location of the appliance 3. In the embodiment, the installation location 2303 includes coordinates (in pixel units) on the floor plan displayed by the display 21.

The electric field strength level 2304 includes a level of the electric field strength (that is, radio quality index) in wireless communication with the appliance 3. In the embodiment, the electric field strength level 2304 includes either "0" (poor electric field strength) or "1" (good electric field strength).

Figure 6:
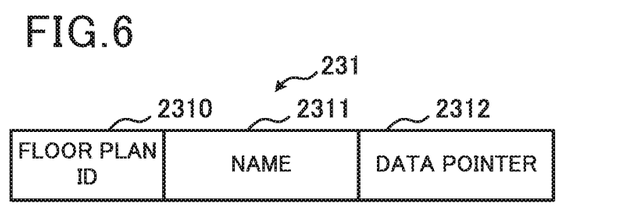
FIG. 6 is a diagram illustrating a configuration of a floor plan management table of the embodiment.

The floor plan management table 231 is a data table in which records including a floor plan ID 2310, a name 2311, a data pointer 2312, and the like as illustrated in FIG. 6 are registered by the number of floor plans to be used.

The floor plan ID 2310 includes an ID for identifying each floor plan similarly to the above-described floor plan ID 2302 (see FIG. 5). The name 2311 includes the name of the floor plan (for example, "first floor", "second floor", or the like). The data pointer 2312 includes information (pointer) indicating a storage location (memory address) of image data (floor plan data 232) corresponding to the floor plan.

The floor plan data 232 is image data of a floor plan corresponding to each floor of the home H. The floor plan data 232 may be, for example, data requested by the terminal device 2 and then transmitted by the home controller 1, or data available by taking a picture of a working drawing or the like of the home H by an unillustrated camera included in the terminal device 2. When the floor plan data 232 is newly stored in the data storage 23, the control unit 24 assigns an ID to this floor plan data and displays on the display 21 a screen to prompt the user to enter the name (floor plan name entry screen). The user can enter the name (for example, "first floor" or the like) to be assigned to the floor plan via the floor plan name entry screen.

After the user enters the name of the floor plan, the control unit 24 generates record in which the preassigned ID, the entered name, and the pointer indicating the storage location of the floor plan data are stored in the floor plan ID 2310, the name 2311, and the data pointer 2312, respectively, and then the control unit 24 registers the record into the floor plan management table 231. The user may change the name of the floor plan as appropriate by operation through the input unit 20. The user can delete the floor plan data 232 and the record of the floor plan management table 231 corresponding to the floor plan data 232 by operation through the input unit 20, both of which are stored in the data storage 23.

Figure 7:
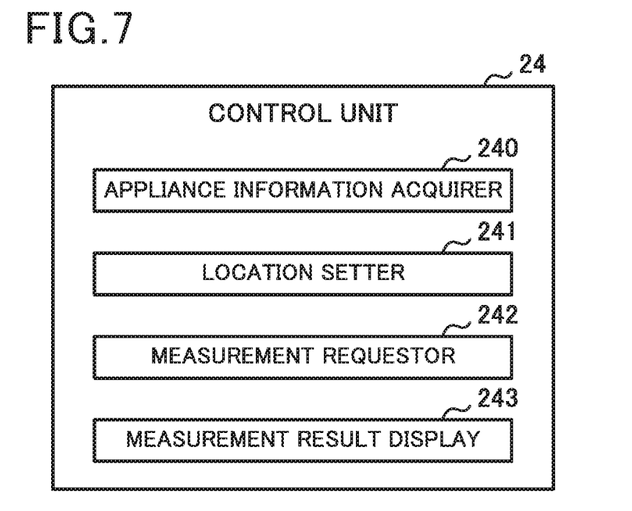
FIG. 7 is a block diagram illustrating a functional configuration of a control unit of the terminal device of the embodiment.

The control unit 24 includes CPU, ROM, RAM, and the like, none of which are illustrated, and provides overall control of the terminal device 2. The control unit 24 includes, as characterizing features of a technique of the present disclosure, an appliance information acquirer 240, a location setter 241, a measurement requestor 242, and a measurement result display 243, as illustrated in FIG. 7. The features of these components are realized by CPU and the like of the control unit 24 executing the program for the above-described installation location planning assistance process stored in the data storage 23.

The appliance information acquirer 240 acquires, from the home controller 1, appliance information of each appliance 3 installed in the home H. More specifically, upon activation of the program for the above-mentioned installation location planning assistance process, the appliance information acquirer 240 generates data (appliance information request data) for requesting transmission of the appliance info nation of each appliance 3 installed in the home H, and then transmits the data via the communicator 22 to the home controller 1.

In response to the appliance information request data, the appliance information acquirer 240 receives, via the communicator 22, data (appliance information data) transmitted by the home controller 1. This appliance information data includes the appliance information of each appliance 3. Here, each piece of appliance information includes an appliance ID, a manufacturer's serial number, an appliance type, and the like. The appliance information acquirer 240 generates record for the appliance information table 230 based on each piece of appliance information, and registers the record into the appliance information table 230. At this moment, each registered record only includes the appliance ID and the manufacturer's serial number.

Figure 8:
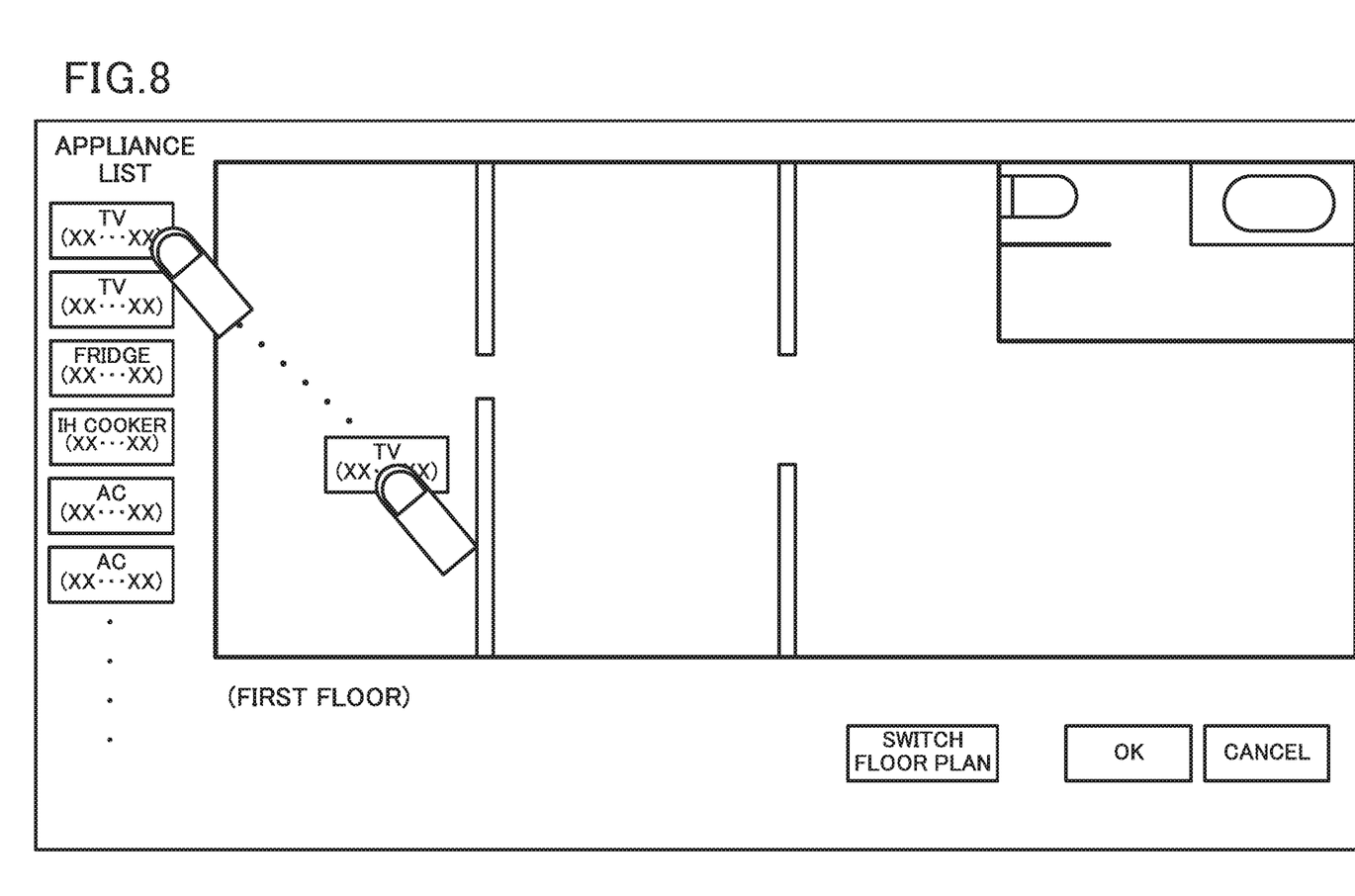
FIG. 8 is a diagram illustrating an example of a location setting screen of the embodiment.

The location setter 241 displays on the display 21 the location setting screen as illustrated in FIG. 8, upon acquisition if the appliance information of each appliance 3 as described above. This location setting screen includes an appliance list displaying area and a floor plan displaying area. An icon corresponding to each appliance 3 is displayed in the appliance list displaying area. The location setter 241 displays the icon corresponding to each appliance 3 based on the appliance information of each appliance 3 acquired from the home controller 1.

The name of the corresponding appliance 3 (for example, "TV", "AC", or the like) and the manufacturer's serial number of the appliance 3 are displayed on each icon. The location setter 241 acquires the name of the appliance 3 by referring to the unillustrated appliance name table stored in the data storage 23. The appliance name table is a data table which includes the appliance type and its associated name. The appliance information acquired from the home controller 1 may include the name of the appliance 3.

The floor plan based on the floor plan data 232 is displayed in the floor plan displaying area. Here, in this embodiment, the floor plan corresponding to the "first floor" is displayed on the location setting screen by default. The user can display another floor plan (for example, the floor plan corresponding to the "second floor") by pressing a SWITCH FLOOR PLAN button provided on the location setting screen.

The user can move the icon by dragging to a desired location on the floor plan so as to position the icon in accordance with the actual installation location of each corresponding appliance 3. The user can then correctly select the icon corresponding to each appliance 3 based on the name and the manufacturer's serial number displayed on the icon.

After the user positions the icon corresponding to each appliance 3 and presses an OK button provided on the location setting screen, the location setter 241 updates the content of the appliance information table 230 for the appliance 3 corresponding to each icon positioned on the floor plan of the location setting screen. That is, the location setter 241 stores the ID of the displayed floor plan in the floor plan ID 2302 and stores the coordinates of the icon on the floor plan in the installation location 2303, for the record of the appliance information table 230 corresponding to each icon positioned on the floor plan.

In addition, when the OK button is pressed, the measurement requestor 242 requests the home controller 1 to measure the electric field strength for a specified appliance 3. More specifically, the measurement requestor 242 generates data (measurement request data) for requesting measurement of the electric field strength for the appliance 3 corresponding to each icon positioned on the floor plan of the location setting screen, and transmits the data via the communicator 22 to the home controller 1. The measurement request data includes the appliance ID of the appliance 3 corresponding to each icon positioned on the floor plan. When the user presses a CANCEL button provided on the location setting screen, the location setter 241 closes the location setting screen and completes the installation location planning assistance process.

The measurement requestor 242 (radio quality acquirer) receives, via the communicator 22, data (measurement result data) that is transmitted by the home controller 1 in response to the measurement request data. The measurement result data includes the appliance ID of each specified appliance 3 and its associated measurement result (here, the electric field strength level). The measurement requestor 242 stores the measurement result corresponding to each appliance 3 in the electric field strength level 2304 of the corresponding record in the appliance information table 230.

Figure 9:
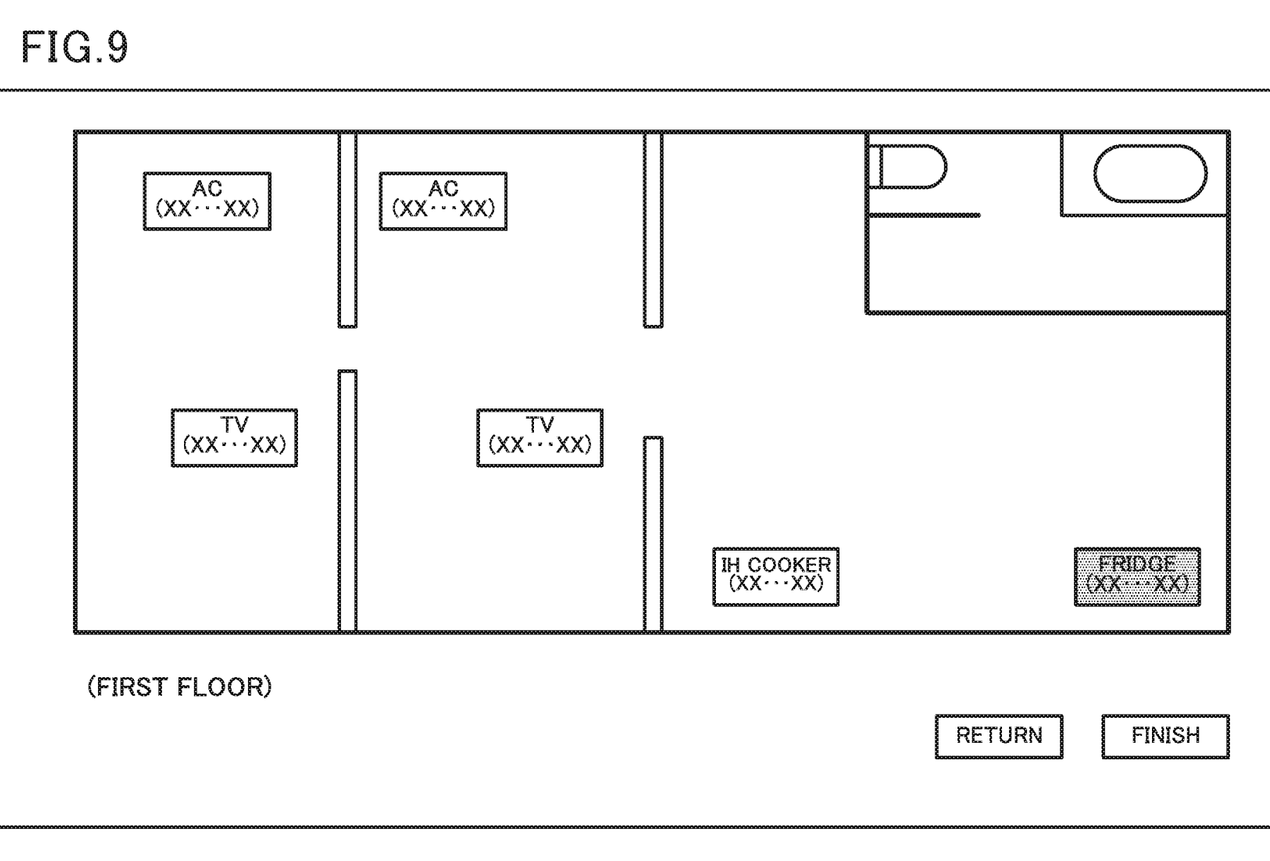
FIG. 9 is a diagram illustrating an example of a measurement result screen of the embodiment.

The measurement result display 243 (radio quality display) displays the measurement result corresponding to each appliance 3. Specifically, the measurement result screen as illustrated in FIG. 9 is displayed on the display 21. The measurement result display 243 highlights the icon corresponding to the appliance 3 having "poor" electric field strength level in a predetermined mode on the measurement result screen. For example, the background color of such an icon is displayed with a particular color (for example, red). The icon may alternatively be displayed as a flashing icon. The icon corresponding to a refrigerator is highlighted in an example of FIG. 9, and this highlight indicates the poor level of the electric field strength in the wireless communication between the home controller 1 and the refrigerator.

When a FINISH button provided on this measurement result screen is pressed, the measurement result display 243 closes the measurement result screen and completes the installation location planning assistance process. When a RETURN button provided on this measurement result screen is pressed, the measurement result screen is closed and the location setting screen in FIG. 8 is displayed again.

Figure 10:
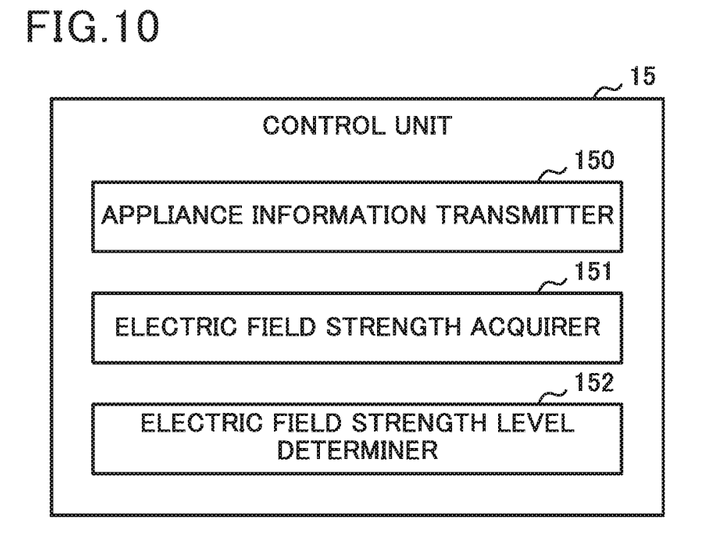
FIG. 10 is a block diagram illustrating a functional configuration of a control unit of the home controller of the embodiment.

The functions of the control unit 15 of the home controller 1 are described hereinafter. The control unit 15 includes, as characterizing features of a technique of the present disclosure, an appliance information transmitter 150, an electric field strength acquirer 151, and an electric field strength level determiner 152, as illustrated in FIG. 10. The features of these components are realized by CPU or the like of the control unit 15 executing the unillustrated program for the installation location planning assistance process stored in the data storage 13. Moreover, although unillustrated, the control unit 15 additionally includes, for example, functioning parts for monitoring the operating states of each appliance 3 and for controlling the operation thereof.

Upon reception of the above-described appliance information request data from the terminal device 2 via the terminal communicator 11, the appliance information transmitter 150 generates appliance information data which includes appliance information (an appliance ID, a manufacturer's serial number, an appliance type, and the like) of each appliance 3 installed in the home H. Then, the appliance information transmitter 150 transmits the generated appliance information data via the terminal communicator 11 to the terminal device 2.

Upon reception of the above-described measurement request data from the terminal device 2 via the terminal communicator 11, the electric field strength acquirer 151 acquires the electric field strength in the wireless communication between the home controller 1 and the specified appliance 3. More specifically, the electric field strength acquirer 151 extracts all the appliance IDs stored. In the received measurement request data. The electric field strength acquirer 151 then transmits response request data via the appliance communicator 10 to the communication adapter 30 connected to the appliance 3 corresponding to each extracted appliance ID. The response request data is data for requesting each communication adapter 30 to transmit response data (any contents).

Upon reception of the response data from each communication adapter 30 via the appliance communicator 10, the electric field strength acquirer 151 acquires the measurement result (that is, RSSI) of the electric field strength measurer 14, and stores, in RAM or the like, the measurement result in association with the appliance ID stored in the received response data.

The electric field strength level determiner 152 (radio quality index determiner) determines an electric field strength level (that is, an index of the radio quality) corresponding to each appliance 3 based on the RSSI of each appliance 3 acquired by the electric field strength acquirer 151 and a predetermined threshold. For example, when the acquired RSSI is equal to or greater than the threshold, the electric field strength level determiner 152 sets the electric field strength level corresponding to the appliance 3 to "1" (good electric filed strength). On the other hand, when the acquired RSSI is less than the threshold, the electric field strength level determiner 152 sets the electric field strength level corresponding to the appliance 3 to "0" (poor electric field strength). If the response data is not received when the elapsed time since transmission of the response request data has reached a predetermined time, the electric field strength level determiner 152 sets the electric field strength level corresponding to the appliance 3 to "0" (poor electric filed strength).

The electric field strength level determiner 152 determines the electric field strength level corresponding to each appliance 3, as described above. The electric field strength level determiner 152 generates measurement result data which includes each determined electric field strength level and its associated appliance ID, and transmits the generated measurement result data via the terminal communicator 11 to the terminal device 2.

Figure 11:
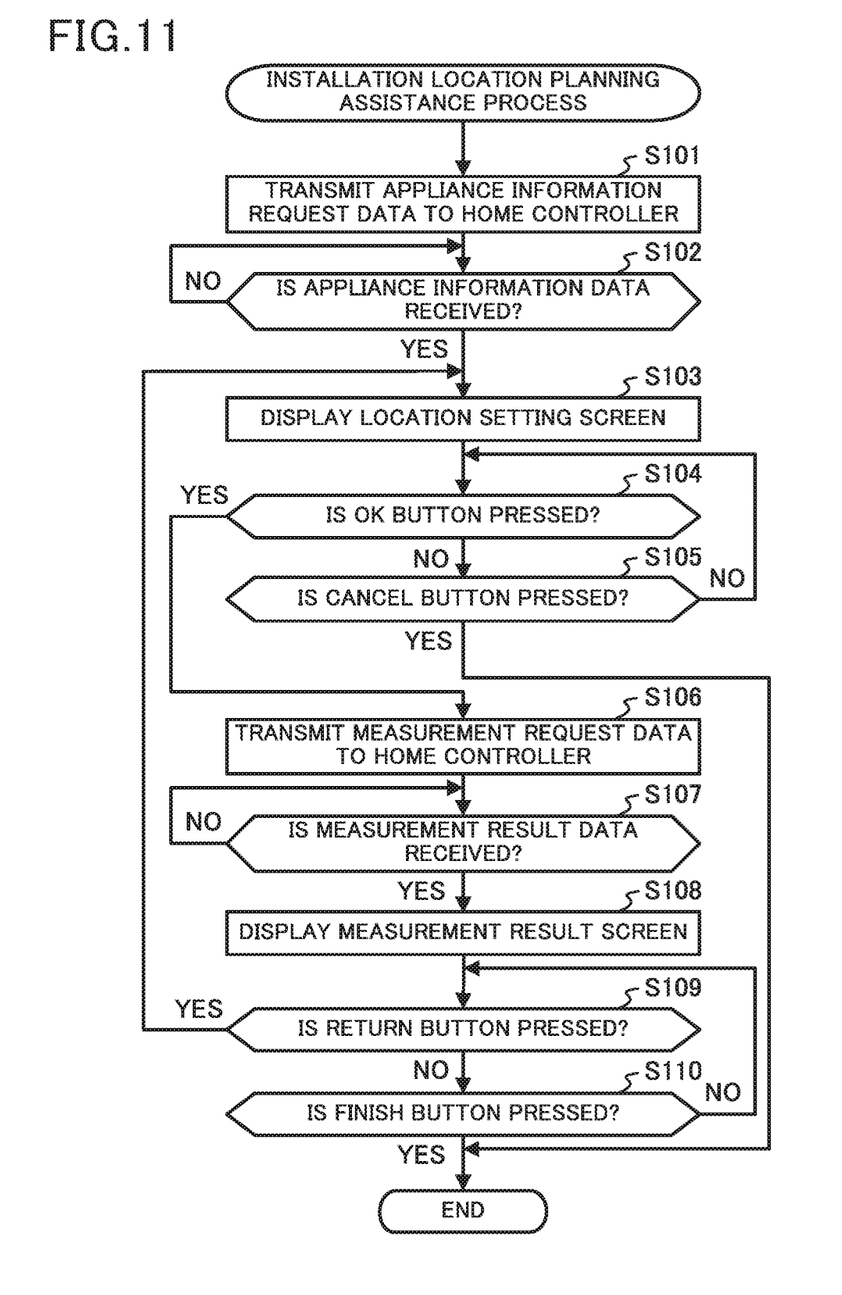
FIG. 11 is a flowchart illustrating a procedure of an installation location planning assistance process of the embodiment.

FIG. 11 is a flowchart illustrating a procedure of the installation location planning assistance process performed by the control unit 24 of the terminal device 2. This installation location planning assistance process starts with activation, by a user operation, of a program for the installation location planning assistance process stored in the data storage 23.

The appliance information acquirer 240 transmits, to the home controller 1, data for requesting transmission of the appliance information (appliance information request data) of each appliance 3 (Step S101). Upon reception of appliance information data transmitted by the home controller 1 in response to the appliance information request data (Step S102; YES), the location setter 241 displays the location setting screen (see FIG. 8) on the display 21 based on the appliance information of each appliance 3, which is included in the appliance information data (Step S103).

The user can position an icon corresponding to each appliance 3, by dragging, on the floor plan displayed on the location setting screen in accordance with the actual installation location.

When the user presses the OK button on the location setting screen (Step S104; YES), the measurement requestor 242 transmits, to the home controller 1, data (measurement request data) for requesting measurement of the electric field strength for the appliance 3 corresponding to each icon positioned on the floor plan of the location setting screen (Step S106).

When the user alternatively presses the CANCEL button of the location setting screen (Step S105; YES), the location setter 241 completes the installation location planning assistance process.

Upon reception of the measurement result data transmitted by the home controller 1 in response to the transmitted measurement request data (Step S107; YES), the measurement result display 243 displays the measurement result screen (see FIG. 9) on the display 21 (Step S108).

When the user presses the RETURN button on the measurement result screen (Step S109; YES), the process of the control unit 24 is retuned to Step S103. When the user otherwise presses the FINISH button on the measurement result screen (Steps S110; YES), the measurement result display 243 completes the installation location planning assistance process.

As described above, the installation location planning assistance system according to embodiments of the present disclosure enables a user, such as a person in charge of the installation or the like, to easily know the positional relationship of each appliance 3 and the electric field strength level ("good" or "poor") of each appliance 3 via the measurement result screen displayed on the terminal device 2. Therefore, the user can easily plan the appropriate location for installation of the home controller 1 to ensure communication between the home controller 1 and all the appliances 3.

Of course, the present disclosure is not limited to the above-described embodiment, hut various modifications may be made without departing from the spirit and scope of the present disclosure.

For example, in the above-described embodiment, the icons displayed on the location setting screen (see FIG. 8) or the measurement result screen (see FIG. 9) have the same shape, but the icons having different shapes in accordance with the appliance type or the like of the appliance 3 may be displayed. In such a case, the icon data of the corresponding shape for each appliance type of the appliance 3 may be pre-stored in the data storage 23.

The electric field strength level determiner 152 of the control unit 15 of the home controller 1 may determine the electric field strength level of ea h appliance 3 on a scale of three or more grades (for example, the grades are ordered from the lowest level, 0, 1, 2, . . . , or the like). In this case, the measurement result display 243 of the control unit 24 of the terminal device 2 may display each icon an as to visualize the grades of the electric field strength level.

In addition, the icon corresponding to the home controller 1 may also be displayed in the appliance list displaying area on the location setting screen (see FIG. 8), and a user may move that icon by dragging to a desired location on the floor plan to position the icon in accordance with the current installation location of the home controller 1. This makes it easier for the user to know the positional relationship between the home controller 1 and each appliance 3 through the measurement result screen (see FIG. 9) and to plan an appropriate location for installation of the home controller 1.

In addition, after the user positions the icon corresponding to each appliance 3 on the floor plan on the location setting screen, information (icon location information), which includes a size of the floor plan (x (pixel)×y (pixel)) and the icon location (here, the coordinates on the floor plan) corresponding to each appliance 3, may be transmitted from the terminal device 2 to the home controller 1. This allows the home controller 1 to, for example, generate equipotential lines of the electric field strength level on the floor plan based on the determined electric field strength level for each appliance 3 and the icon location information received from the terminal device 2, and to transmit the generated result to the terminal device 2. As a result, the equipotential lines of the electric field strength level can be superimposed on the floor plan on the measurement result screen of the terminal device 2.

Figure 12:
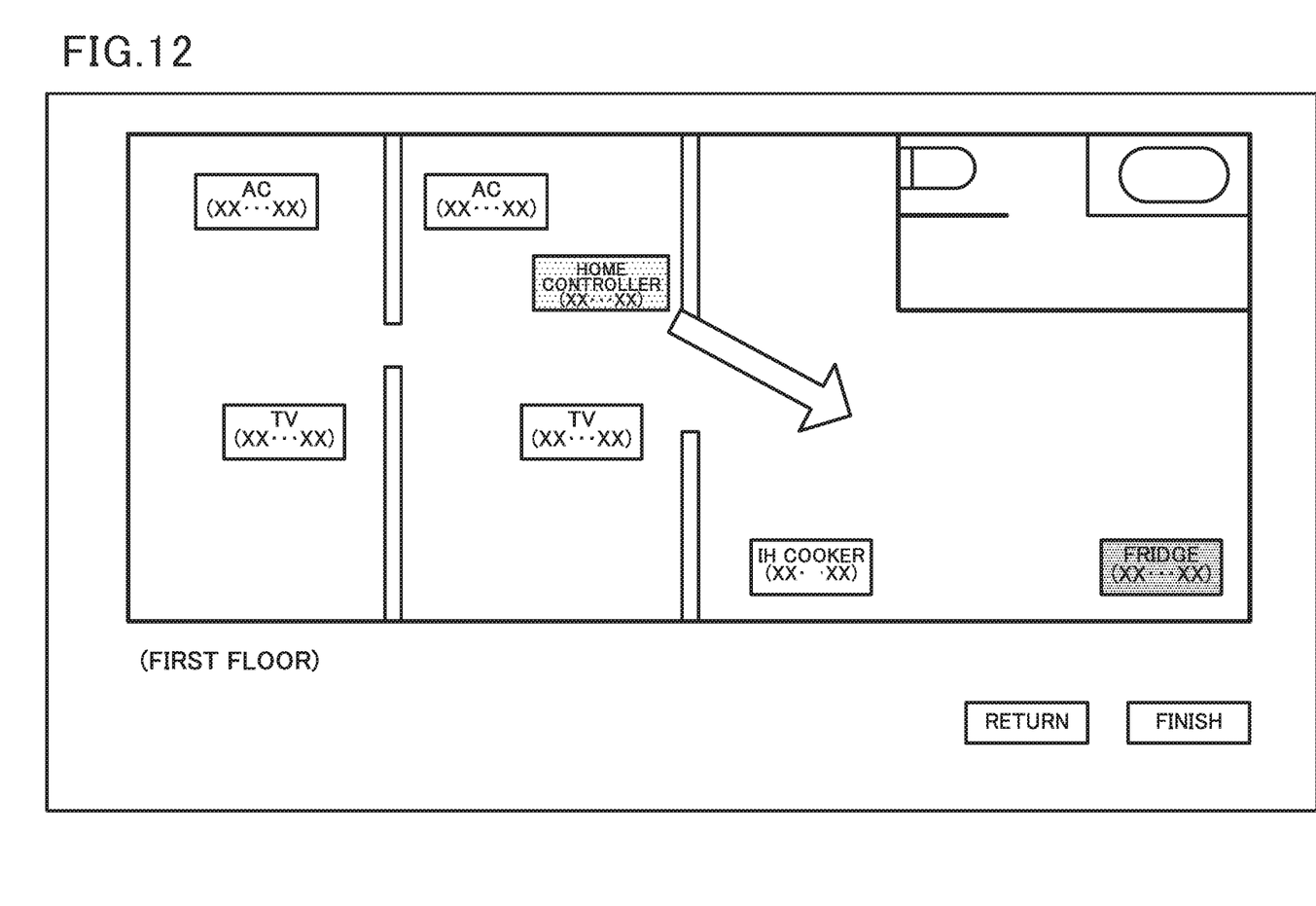
FIG. 12 is a diagram illustrating an example of a measurement result screen of an alternative embodiment.

Moreover, the terminal device 2 may be provided such that the icon corresponding to the home controller 1 can also be positioned on the floor plan as described above, and the coordinates of the icon corresponding to the home controller 1 may be transmitted to the home controller 1 along with the above-described icon location information. In this way, the control unit 15 of the home controller 1 can generate advisory information about movement of the home controller 1. For example, the control unit 15 generates, as advisory information, information indicating the direction pointing to the appliance 3 having a "poor" electric field strength level from the current position of the home controller 1. The control unit 15 of the home controller 1 then transmits the generated advisory information to the terminal device 2. The advice on the direction of movement is thereby displayed on the measurement result screen of the terminal device 2, as illustrated in FIG. 12.

Figure 13:
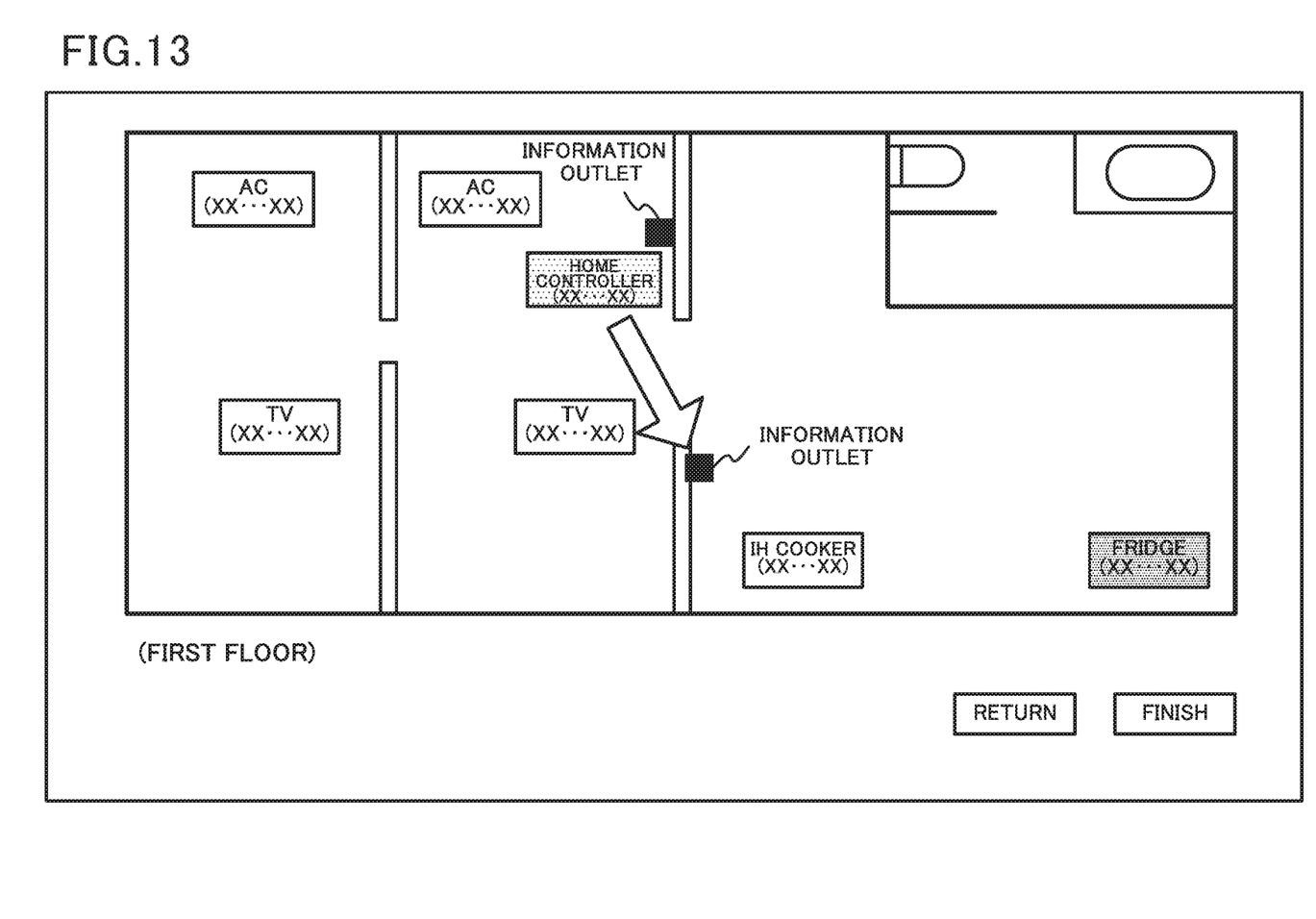
FIG. 13 is a diagram illustrating an example of a measurement result screen of another alternative embodiment.

The terminal device 2 may be provided such that an icon corresponding to an information outlet (here, a connection port of a wired LAN) can also be positioned on the floor plan in addition to the icon corresponding to the home controller 1, and the coordinates of the icon corresponding to the home controller 1 and the information outlet may be transmitted along with the above-described icon location information to the home controller 1. Because the installation location of the home controller 1 is usually near the information outlet, the control unit 15 of the home controller 1 can generate the above-described advisory information also by taking into account the installation location of each information outlet. The advice on the direction of movement displayed on the measurement result screen of the terminal device 2 thereby conforms more closely to the actual situation, as illustrated in FIG. 13.

After the icon corresponding to each appliance 3 is positioned on the location setting screen (see FIG. 8), the terminal device 2 may be able to request the home controller 1 to measure the electric field strength for the appliance 3 individually specified by the user.

In the above-described embodiments, a program to be executed by die home controller 1 or the terminal device 2 may be stored and distributed on a computer-readable recording medium, such as a compact disc read-only memory (CD-ROM), a digital versatile disc (DVD), a magneto-optical disk (MO), a universal serial bus (USB) memory, or a memory card. Moreover, installation of the program in an application-specific or general-purpose computer enables the computer to function as the home controller 1 or the terminal device 2.

The above-described program may be stored on a disk device or the like of a server device on a communication network, such as the Internet or the like, to enable the program to be downloaded in the computer, for example by superimposing the program onto a carrier wave.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2013-164385, filed on Aug. 7, 2013, the entire disclosure of which is incorporated by reference herein.

INDUSTRIAL APPLICABILITY

The technique of the present disclosure is preferably used in an operation management system for household electrical appliances, and the like.

REFERENCE SIGNS LIST

1 Home controller
2 Terminal device.
3 Appliance
4 Power measuring device
5 Wired LAN
6 External server
10 Appliance communicator
11 Terminal communicator
12 Wide-area communicator
13, 23 Data storage
14 Electric field strength measurer
15, 24 Control unit
20 Input unit
21 Display
22 Communicator
30 Communication adapter
150 Appliance information transmitter
151 Electric field strength acquirer
152 Electric field strength level determiner
230 Appliance information table
231 floor plan management table
232 floor plan data
240 Appliance information acquirer
241 Location setter
242 Measurement requestor
243 Measurement result display
N Wide-area network

The invention claimed is:

1. A method for assisting in planning an installation location, the method comprising:
    acquiring, by an appliance information acquirer of a terminal device with an input unit and a display, from a controller, appliance information including identification information for an appliance;
    displaying, by a location setter of the terminal device, on the display a view that shows an inside of a building and a first icon that is associated with the appliance based on the acquired appliance information, and positioning, by the location setter, the first icon on the view in accordance with a user first icon operation received by the input unit;
    receiving, by the input unit, a user measurement-request operation to request measurement of an actual electric field strength for the first icon positioned on the view and then acquiring, by a radio quality acquirer of the terminal device, from the controller, an electric field strength level for the appliance, the electric field strength level being determined by the controller based on the actual electric field strength of wireless communication between the controller and the appliance, the actual electric field strength being measured by the controller; and
    changing, by a radio quality display of the terminal device, a display mode of the first icon positioned on the view, wherein the display mode of the first icon is a predetermined visual quality of the first icon that indicates the current, actual acquired electric field strength level for the appliance.

2. The method according to claim 1, further comprising by the location setter, displaying on the display a second icon corresponding to the controller and providing the controller with information including a size of the view and location information of the first icon and the second icon positioned on the view,
    acquiring, by the radio quality acquirer, from the controller, advisory information about movement to an appropriate location for user installation of the controller, and
    displaying, by the radio quality display, an indication that is based on the advisory information.

3. The method according to claim 2, wherein
    the advisory information indicates a direction of movement to an appropriate location for user installation of the controller, and further comprising
    displaying, by the radio quality display, the direction of movement of the controller on the view based on the advisory information.

4. The method according to claim 1, further comprising highlighting, by the radio quality display, the first icon when radio quality for the appliance is poor.

5. The method according to claim 1, wherein
    the electric field strength level is indicated on a scale of three or more grades, and further comprising
    displaying, by the radio quality display, the first icon so as to visualize the grades of the electric field strength level.

6. The method according to claim 1, further comprising transmitting, from the radio quality acquirer, to the controller, a measurement request to measure the electric field strength of the appliance;
    measuring, by the controller, in response to the measurement request, as the electric field strength, a radio signal strength of a radio signal received at the controller from a communication adapter of the appliance;
    then determining, by the controller, the electric field strength level for the appliance, based on the measured electric field strength; and
    then transmitting, from the controller, to the radio quality acquirer, the electric field strength level.

7. The method according to claim 1, wherein a name of the appliance that is associated with the first icon is displayed on the first icon.

8. A terminal device, comprising:
    a central processing unit (CPU) configured to
        acquire, by an appliance information acquirer, appliance information including identification information for an appliance from a controller,
        display, by a location setter, on a display of the terminal device, a view that shows an inside of a building and an icon that is associated with the appliance based on the acquired appliance information, and position, by the location setter, the icon on the view in accordance with a user icon operation received by an input unit of the terminal device, receive, by the input unit, a user measurement-request operation to request measurement of an actual electric field strength for the icon positioned on the view and then acquire, by a radio quality acquirer, from the controller, an electric field strength level for the appliance, the electric field strength level being determined by the controller based on the actual electric field strength of wireless communication between the controller and the appliance, the actual electric field strength being measured by the controller, and change, by a radio quality display, a display mode of the icon positioned on the view, wherein the display mode of the icon is a predetermined visual quality of the icon that indicates the current, actual acquired electric field strength level for the appliance.

9. The terminal device according to claim 8, wherein a name of the appliance that is associated with the icon is displayed on the icon.

10. A system for assisting in planning an installation location, the system comprising:

a terminal device with an input unit and a display; and
a controller,
the terminal device comprising:
 a first central processing unit (CPU) configured to
  acquire, by an appliance information acquirer, appliance information of an appliance by requesting the appliance information from the controller,
  display, by a location setter, on the display a view that shows an inside of a building and an icon that is associated with the appliance based on the acquired appliance information, and position, by the location setter, the icon on the view in accordance with a user icon operation received by the input unit,
  receive, by the input unit, a user measurement-request operation to request measurement of an actual electric field strength for the icon positioned on the view and then acquire, by a radio quality acquirer, an electric field strength level for the appliance by requesting the electric field strength level from the controller; and
  change, by a radio quality display, a display mode of the icon, wherein the display mode of the icon is a predetermined visual quality of the icon that indicates the current, actual acquired electric field strength level for the appliance, and
the controller comprising:
 an electric field strength measurer configured to measure an actual electric field strength of wireless communication with the appliance; and
 a second CPU configured to
  transmit, by an appliance information transmitter, to the terminal device, data including appliance information including identification information for the appliance in response to the request from the appliance information acquirer of the terminal device,
  acquire, by an electric field strength acquirer, from the electric field strength measurer, the actual electric field strength for the appliance in response to the request from the radio quality acquirer of the terminal device; and
  determine, by a radio quality index determiner, an actual electric field strength level for the appliance based on the acquired actual electric field strength for the appliance, and transmit, by the radio quality index determiner, the data including the determined actual electric field strength level to the terminal device.

11. The system according to claim 10, wherein a name of the appliance that is associated with the icon is displayed on the icon.

12. A non-transitory computer-readable recording medium storing a program, the program causing a central processing unit (CPU) included a computer to function as:

an appliance information acquirer of a terminal device with an input unit and a display, the appliance information acquirer is configured to acquire appliance information including identification information for an appliance from a controller;

a location setter configured to display on the display a view that shows an inside of a building and an icon that is associated with the appliance based on the acquired appliance information, and to position the icon on the view in accordance with a user icon operation received by the input unit;

receive, by the input unit, a user measurement-request operation to request measurement of an actual electric field strength for the icon positioned on the view and then acquire, by a radio quality acquirer, an electric field strength level for the appliance from the controller, the electric field strength level being determined by the controller based on the actual electric field strength of wireless communication between the controller and the appliance, the actual electric field strength being measured by the controller; and a radio quality display configured to change a display mode of the icon positioned on the view, wherein the display mode of the icon is a predetermined visual quality of the icon that indicates the current, actual acquired electric field strength level for the appliance.

13. The non-transitory computer-readable recording medium according to claim 12, wherein a name of the appliance that is associated with the icon is displayed on the icon.

* * * * *